United States Patent [19]

Schlessmann et al.

[11] Patent Number: 5,706,777
[45] Date of Patent: Jan. 13, 1998

[54] SUCTION AIR FILTER FOR A COMBUSTION ENGINE WITH DIAPHRAGM CARBURETOR

[75] Inventors: Helmut Schlessmann, Prüm; Hans-Georg Wiedmann, Backnang; Rudolf Dirks, Weinstadt, all of Germany

[73] Assignee: Andreas Stihl, Waiblingen, Germany

[21] Appl. No.: 695,337

[22] Filed: Aug. 9, 1996

[30] Foreign Application Priority Data

Aug. 12, 1995 [DE] Germany ............. 295 12 983 U

[51] Int. Cl.$^6$ ............................................. F02B 77/00
[52] U.S. Cl. ............... 123/198 E; 55/385.3; 55/486; 55/501; 55/DIG. 28
[58] Field of Search .............. 123/198 E; 55/385.3, 55/486, 501, 503, DIG. 13, DIG. 28

[56] References Cited

U.S. PATENT DOCUMENTS

| | | | |
|---|---|---|---|
| 4,396,407 | 8/1983 | Reese | 123/198 E |
| 5,429,776 | 7/1995 | Edlund | 261/35 |

Primary Examiner—Noah P. Kamen
Attorney, Agent, or Firm—Robert W. Becker & Associates

[57] ABSTRACT

A suction air filter for an internal combustion engine with a diaphragm carburetor, wherein the combustion engine has a suction channel for taking in combustion air from a clean air side of the air filter and for taking in fuel from a fuel chamber, wherein the diaphragm of the diaphragm carburetor controls the intake of the fuel into the fuel chamber, and wherein the dry side of the diaphragm is loaded with the pressure of the clean side of the suction air filter, has a housing and a filter body including a block of foamed plastic material and a blocking layer connected to one side of the block. The filter body is positioned in the housing such that the blocking layer is located at the clean side of the suction air filter.

12 Claims, 1 Drawing Sheet

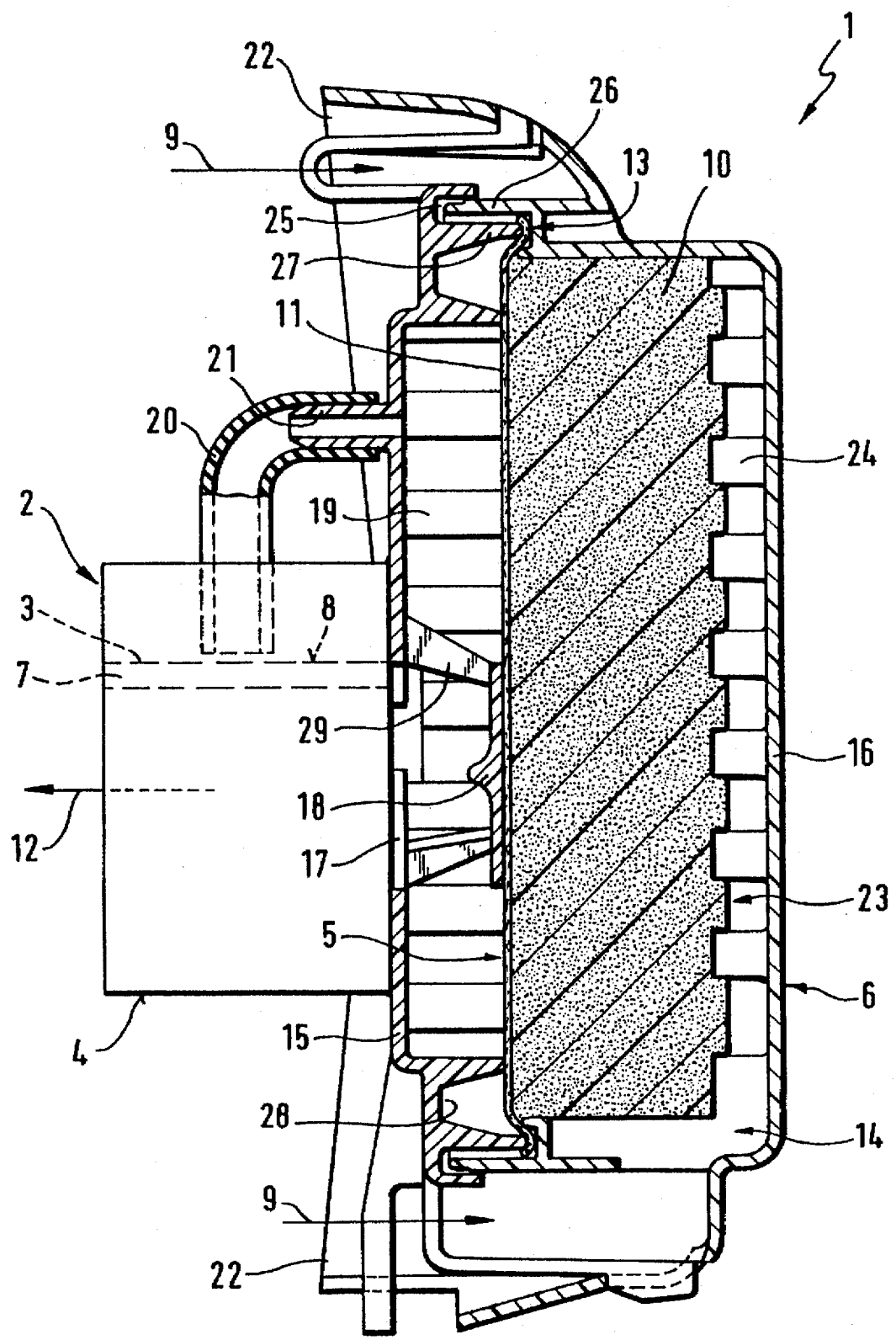

SUCTION AIR FILTER FOR A COMBUSTION ENGINE WITH DIAPHRAGM CARBURETOR

BACKGROUND OF THE INVENTION

The present invention relates to a suction air filter for an internal combustion engine with a diaphragm carburetor, especially for a two-stroke engine in a hand-held working tool such as a motor chainsaw etc., having a suction channel which takes in combustion air from the clean side of the air filter and fuel from the fuel chamber, whereby a control diaphragm of the diaphragm carburetor controls the fuel intake into the fuel chamber and wherein the dry side of the diaphragm is loaded with the pressure of the clean side of the air filter.

Such a suction air filter is known from U.S. Pat. No. 5,429,776. Ambient air is sucked through the air filter into the suction channel of an internal combustion engine which together with the introduced fuel forms a combustible mixture. The fuel is introduced from a fuel chamber into the diaphragm carburetor whereby the flow of fuel into the fuel chamber is controlled by a control valve which is actuated by a control diaphragm as a function of the differential pressure between the fuel chamber and the dry side of the diaphragm. The dry side of the control diaphragm facing away from the fuel chamber is loaded by the pressure of the clean side of the air filter so that a vacuum present at the clean side of the air filter also acts on the control diaphragm.

The air filter is designed as an annular filter and is subjected to an air flow in the radial direction from the exterior to the interior. In general, the body of the filter for such a design is embodied as a folded filter which during the course of operation will become clogged with dirt particles. With increasing degree of soiling, the vacuum at the clean side of the air filter increases such that this vacuum is also present at the control diaphragm in order to effect a fuel intake compensated according to the pressure ratios. Even for a reduced air intake it is thus possible to provide a substantially uniform mixture.

A decrease in output due to a too rich mixture of fuel and air is observed by the operator only when the filter body is completely clogged with dirt particles and the reduced amount of intake air can no longer be compensated.

It is known to use as a filter body air-permeable foamed plastic materials. Such filter bodies, depending on material and design, have a certain capacity for receiving dirt particles. When the foamed material is clogged with dirt, it is possible that with increasing vacuum dirt particles pass through the filter body and into the suction channel. The use of foamed filter bodies for pressure-compensated diaphragm carburetors is therefore not reliable in regard to proper operation because for the operator, due to the pressure compensation, it is not possible to determine reliably whether the filter action is still available or whether dirt particles can already pass through the foamed plastic filter. It is therefore necessary that the operator service the filter in regular intervals in order to prevent that dirt can enter the suction channel of the combustion engine.

It is therefore an object of the present invention to provide a suction air filter for a pressure-compensated diaphragm carburetor which, with minimal material and manufacturing costs and expenditures, provides an increased functional reliability.

SUMMARY OF THE INVENTION

A suction air filter for an internal combustion engine with a diaphragm carburetor, wherein the combustion engine has a suction channel for taking in combustion air from a clean air side of the air filter and for taking in fuel from a fuel chamber, wherein the diaphragm of the diaphragm carburetor controls the intake of the fuel into the fuel chamber and wherein the dry side of the diaphragm is loaded with the pressure at the clean side of the suction air filter, according to the present invention is primarily characterized by:

A housing;

A filter body comprising a block of foamed plastic material and a blocking layer connected to one side of the block, the filter body positioned in the housing such that the blocking layer is located at the clean side of the suction air filter.

Preferably, the blocking layer is a blocking filter device arranged perpendicular to the flow direction of the combustion air. Advantageously, the blocking layer is comprised of paper.

Expediently, the block and the blocking layer are separate components. Advantageously, the block rests areally at the blocking layer.

In a preferred embodiment of the present invention the blocking layer is membrane-shaped and secured by clamping in the housing.

Preferably, the blocking layer has peripheral edges and is clamped with the peripheral edges in a flow-tight manner within the housing.

Advantageously, the housing has a receiving chamber and the block and the blocking layer are arranged in the receiving chamber.

Expediently, the housing has a detachable cover and a bottom, wherein the chamber is delimited by the cover and the bottom.

Expediently, the bottom has an outlet opening for connecting the housing to the suction channel of the diaphragm carburetor.

Preferably, the bottom comprises a baffle resting at the blocking layer, the baffle aligned with the outlet opening.

In yet another embodiment of the present invention, the bottom has a socket for receiving a compensation channel to connect the clean side of the air suction filter to the dry side of the diaphragm.

Expediently, the housing has projections for supporting a side of the blocking layer facing away from the block.

The projections are preferably evenly distributed.

The projections, in a preferred embodiment of the invention, are integrally formed with the housing.

The manufacture of a foamed plastic material block with a blocking layer arranged downstream in the direction of flow is simple and inexpensive. Even after surpassing the maximum dirt particle capacity of the foamed plastic material block it is impossible for dirt particles to reach the suction channel because the dirt particles passing through the block will be retained at the blocking layer.

The dirt particles that pass through the foamed plastic material block will eventually completely block the blocking layer so that the amount of air passing through is greatly reduced and the suction vacuum at the clean side of the blocking layer is increased such that the pressure compensation is no longer sufficient and the fuel/air mixture becomes too rich. The operator thus will notice a considerable output reduction which simultaneously is an indicator for changing the air filter. A minimal pressure loss at the clean side of the air filter, on the other hand, can be easily compensated by the pressure compensation mechanism.

Expediently, the blocking layer is a planar blocking filter device which is arranged perpendicular to the flow direction of the combustion air and is advantageously made of paper. Such paper layers can be easily transported and exchanged on site.

The foamed plastic material block and the blocking layer may be embodied as separate components, whereby the block is advantageously areally placed onto the blocking layer and is supported thereat. The suction channel is covered during replacement of the foamed plastic material block by the blocking layer so that no dirt particles can be introduced into the suction channel.

BRIEF DESCRIPTION OF THE DRAWING

The object and advantages of the present invention will appear more clearly from the following specification in conjunction with the accompanying only drawing, in which the inventive suction air filter connected to a diaphragm carburetor is shown in section.

DESCRIPTION OF PREFERRED EMBODIMENTS

The present invention will now be described in detail with the aid of a specific embodiment utilizing the only FIGURE.

The suction air filter 1 is provided for cleaning the combustion air of an internal combustion engine which is, for example, the two-stroke engine of a hand-held working tool, such as a motor chainsaw. The combustion engine is supplied with a fuel/air mixture via the schematically represented diaphragm carburetor 2. Within the diaphragm carburetor 2 a control diaphragm 3 acts on a control valve for controlling the fuel intake into a fuel chamber 7 which is delimited by the control diaphragm 3. The fuel chamber 7 is connected with a main nozzle and an idle nozzle to the venturi section of the suction channel 4 in which the fuel is mixed with the combustion air introduced via the air filter 1 in order to form a combustible fuel/air mixture. The fuel/air mixture is introduced in the flow direction 12 via the suction channel 4 into the combustion engine.

The suction air filter 1 is comprised of a housing 6 in which the foamed plastic material block 10 is arranged in the flow path of the combustion air to be cleaned. The combustion air is sucked in via the air inlet socket 22 in the direction of arrows 9 from the surrounding whereby the intake direction, i.e., the orientation of the inlet side of the air inlet socket 22, is opposite to the flow direction 12 within the foamed plastic material block 10, respectively, within the suction channel 4. The intake air is deflected within the housing 6 in the flow direction 12 to such a degree that heavy dirt particles will precipitate.

The foamed plastic material block 10 which may be comprised of air-permeable, porous foam made of, for example, polyurethane is inserted into a receiving chamber 14 within the air filter which is provided between the bottom 15 and a detachable cover 16. On the dirt side 23 of the filter, the foamed plastic material block 10 is supported at support ribs 24 which are preferably embodied as a unitary part of the cover 16 of the housing 6 and which are substantially uniformly distributed along the dirt side 23 of the foamed plastic material block 10. The incoming combustion air flows between the support ribs 24 and then through the foamed plastic material block 10.

At the clean side 5 of the filter a blocking layer 11 is provided. This prevents that dirt particles which, after surpassing the maximum dirt holding capacity of the foamed plastic material block, can pass through the block, can enter the suction channel 4 and can thus be introduced into the combustion engine. The blocking layer 11 has a fine-porous structure which retains these dirt particles. The blocking layer 11 is especially embodied as a substantially two-dimensional blocking filter device which provides a planar blocking surface perpendicular to the flow direction 12. Preferably, the blocking filter device is comprised of paper, especially of specialty filter paper.

The foamed plastic material block 10 and the blocking layer 11 are expediently arranged within the chamber 14 between bottom 15 and cover 16 of the housing 6 whereby the blocking layer positioned at the clean side 5 is preferably a separate component which can be introduced independently of the foamed plastic material block into the housing of the suction air filter. The blocking layer 11 is positioned preferably at the foamed plastic material block 10 such that the block 10 of foamed plastic material is supported at the clean side of the filter by the blocking layer so that a pulling of the block 10 into the suction channel 4 due to increased vacuum at the clean side is reliably prevented.

The blocking layer 11 is preferably clamped within the housing 6 in the manner of a diaphragm, whereby the peripheral edges 13 of the blocking layer 11 are clamped between the bottom 15 and the cover 16 of the housing. The bottom 15 is provided with a circumferential groove 25 which is engaged by a correspondingly shaped collar 26 of the cover 16. The blocking layer 11 which is comprised of paper projects in the area of its periphery axially into the groove 25 and is clamped circumferentially between the groove wall 27 of the groove 25 and the collar 26 in the radial direction so as to be flow-tight so that stray air flows between the surrounding and the clean side 5 which is under vacuum can be prevented. The blocking layer 11 can also be fixedly connected to the block 10, i.e., block 10 and layer 11 from a unitary part, so that, for exchanging the block of foamed plastic material, the blocking layer is exchanged at the same time. The blocking layer 11 can be glued with an adhesive to the foamed plastic material block 10 or can be connected thereto in any other positive-locking, force-locking or material-connecting manner.

The blocking layer 11 is supported at the clean side by uniformly distributed projections 19 which are preferably a unitary part of the bottom 15 of the housing 6. The axial extension of the chamber 14, measured in the flow direction 12, between the support ribs 24 at the cover 16 and the projections 19 is somewhat smaller than the thickness of the foamed plastic material block 10 in the un-loaded state including the blocking layer 11. This ensures that the block 10 and the blocking layer 11 are securely clamped, even in the axial direction, within the chamber 14.

The blocking layer 11 can also be clamped at the bottom 15 whereby a peripheral sealing edge of the block 10 engages a complementary sealing groove 28 at the bottom 15 so that the blocking layer can be clamped between the sealing groove and the sealing edge.

The bottom 15 of the housing 6 comprises an outlet opening 17 to which is connected, substantially coaxially, the suction channel 4 and through which the combustion air coming from the clean side 5 of the blocking layer 11 flows into the suction channel 4 in the flow direction of 12. Furthermore, a baffle 18 is provided which is positioned at a distance to the outlet opening 17. The side of the baffle 18 facing the suction channel 4 serves to collect rebounding fuel particles. The baffle 18 is supported with stays 29 at the bottom 15. The blocking layer 11 rests directly at the baffle which thus supports the blocking layer 11 in the flow direction. The projections 19 and the baffle 18 are positioned substantially within one support plane which is spaced at an axial distance to the bottom 15.

At the side of the bottom 15 facing away from the chamber 14, a socket 21 is provided at the bottom which is connected with a compensation hose 20 to the dry side 8 of the control diaphragm 3. The compensation hose 20 transmits pressure present at the clean side onto the dry side of the control diaphragm so that a pressure loss at the clean side and a thus resulting reduced air intake can be compensated in order to provide a stoichiometric fuel/air ratio. An output reduction will only be observed when the blocking layer 11 at the side facing the foamed plastic material block 10 is blocked with dirt particles to such an extent that the passage of air is greatly reduced. This indicates to the operator that the filter must be changed.

Instead of a foamed plastic material, it is also possible to use porous materials such as, for example, sponge rubber or fleece-type material as a filter element.

The present invention is, of course, in no way restricted to the specific disclosure of the specification and drawings, but also encompasses any modifications within the scope of the appended claims.

What is claimed is:

1. A suction air filter for an internal combustion engine with a diaphragm carburetor, wherein the combustion engine has a suction channel for taking in combustion air from a clean air side of said air filter and for taking in fuel from a fuel chamber, wherein the diaphragm of the diaphragm carburetor controls the intake of the fuel into the fuel chamber and wherein the dry side of the diaphragm is loaded with the pressure of the clean side of said suction air filter; said suction air filter comprising:

a housing;

a filter body comprising a block of foamed plastic material and a blocking layer connected to one side of said block, said filter body positioned in said housing such that said blocking layer is located at the clean side of said suction air filter;

wherein said blocking layer is membrane-shaped; and wherein said blocking layer has peripheral edges and is secured in said housing by clamping said peripheral edges in a flow-tight manner within said housing.

2. A suction air filter according to claim 1, wherein said blocking layer is a blocking filter device arranged perpendicular to a flow direction of the combustion air.

3. A suction air filter according to claim 2, wherein said blocking layer is comprised of paper.

4. A suction air filter according to claim 1, wherein said block and said blocking layer are separate components.

5. A suction air filter according to claim 4, wherein said block rests face-to-face at said blocking layer.

6. A suction air filter according to claim 1, wherein said housing has a receiving chamber and wherein said block and said blocking layer are arranged in said receiving chamber.

7. A suction air filter according to claim 6, wherein said housing has a detachable cover and a bottom, wherein said chamber is delimited by said cover and said bottom.

8. A suction air filter according to claim 7, wherein said bottom has an outlet opening for connecting said housing to the suction channel of the diaphragm carburetor.

9. A suction air filter according to claim 7, wherein said bottom has a socket for receiving a compensation channel to connect the clean side of said air suction filter to the dry side of the diaphragm.

10. A suction air filter for an internal combustion engine with a diaphragm carburetor, wherein the combustion engine has a suction channel for taking in combustion air from a clean air side of said air filter and for taking in fuel from a fuel chamber, wherein the diaphragm of the diaphragm carburetor controls the intake of the fuel into the fuel chamber and wherein the dry side of the diaphragm is loaded with the pressure of the clean side of said suction air filter; said suction air filter comprising:

a housing;

a filter body comprising a block of foamed plastic material and a blocking layer connected to one side of said block, said filter body positioned in said housing such that said blocking layer is located at the clean side of said suction air filter;

wherein said housing has a receiving chamber and wherein said block and said blocking layer are arranged in said receiving chamber;

wherein said housing has a detachable cover and a bottom, wherein said chamber is delimited by said cover and said bottom;

wherein said bottom has an outlet opening for connecting said housing to the suction channel of the diaphragm carburetor; and wherein said bottom comprises a baffle resting at said blocking layer, said baffle aligned with said outlet opening.

11. A suction air filter according to claim 10, wherein said blocking layer is membrane-shaped and secured by clamping in said housing.

12. A suction air filter according to claim 11, wherein said blocking layer has peripheral edges and is clamped with said peripheral edges in a flow-tight manner within said housing.

* * * * *